Sept. 2, 1969

J. C. WIRTH 3,465,219

TOOL CONTROL SYSTEM FOR LINEAL MOVEMENT IN
ACCORDANCE WITH SELECTED GEOMETRIC SHAPES
Filed June 30, 1966

INVENTOR.
JON C. WIRTH
BY
Andrus & Starke
Attorneys

12# United States Patent Office 3,465,219
Patented Sept. 2, 1969

3,465,219
TOOL CONTROL SYSTEM FOR LINEAL MOVEMENT IN ACCORDANCE WITH SELECTED GEOMETRIC SHAPES
Jon C. Wirth, Wauwatosa, Wis., assignor, by mesne assignments, to C.R.O. Engineering Co. Inc., Brookfield, Wis., a corporation of Wisconsin
Filed June 30, 1966, Ser. No. 561,770
Int. Cl. G05b 11/00
U.S. Cl. 318—18        21 Claims

ABSTRACT OF THE DISCLOSURE

This disclosure relates to a tool moving servo system having a shift register to automatically and sequentially establish interconnection of X and Y coordinate servo units into the circuit with one unit holding the tool in a reference position and the other driving the tool along such reference position to define a rectangular path for the tool. The shifter register includes a pair of relays sequentially energized to sequentially insert the comparators for the coordinate control drive. Each of the relays has two operative positions which are interrelated and interconnected to establish the four coordinate movements required for rectangular movement.

---

Figure 1:
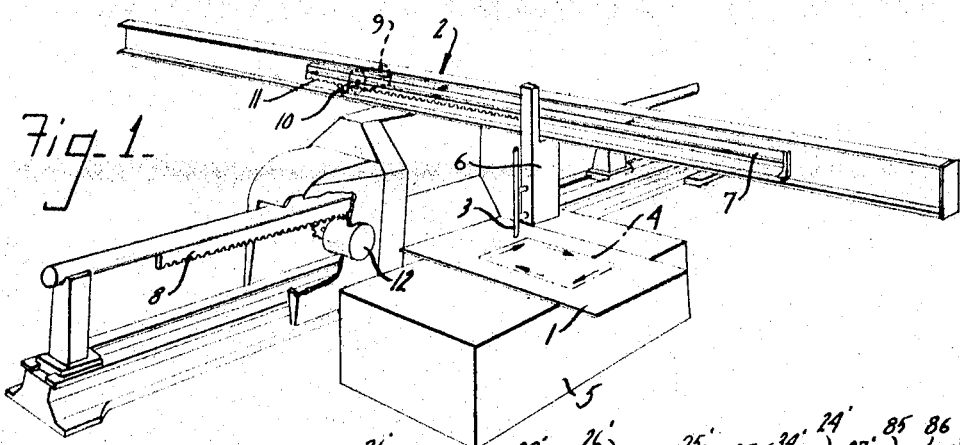

Each relay has set and reset coils connected to pulse sources through the contacts of the opposite relay and the contacts of the opposite null comparator in such a manner that only the relay associated with the established movement of the tool is actuated when it reaches its null position. This provides transfer from one section to the next section and back to the first section.

This invention relates to a servo control system and particularly to the automatic tracking of an element to provide preprogrammed rectangular movement of the element relative to a reference.

Machine tool controls have been devised to provide preprogrammed automatic movement of the tool with respect to a work member in accordance with various configurations. Certain systems provide a template or model and coupling device to automatically move the tool. Other systems provide electrical preset means and a tool position related feedback means connected in a comparator system to position the tool. For example, applicant's copending application entitled Machine Control for Cutting Geometric Shapes filed on the same date as the present application with Ser. No. 561,771, now Patent No. 3,434,212, and assigned to the same assignee particularly discloses a tool or the like mounted on an automatic moving control mechanism to permit cutting of circles of various diameters. In certain production and manufacturing processes, the machine may be employed to make a rectangular cut in a work member.

To provide for the rectilinear or straight line movements in perpendicular relation to each other is the subject matter of the present application. In particular, the present application is directed to a system employing a minimum number of electrical shift means to sequentially interconnect coordinate drive and servo systems in a circuit providing a practical automatic positioning control having a long life with minimum maintenance and initial cost.

Generally, the present invention is connected as part of a control set in accordance with a perpendicular coordinate system, conveniently identified by an X axis and Y axis. Separate comparator devices such as null or balance amplifiers are provided for controlling the movement along the respective perpendicular paths. Each comparator is connected to and receives related similar inputs from a zero reference input unit, a delta setting input unit and an element sensitive position feedback input unit. The delta setting unit and the zero reference unit are separately and selectively connected into the circuit and compared with the signal of the feedback input unit. The output of the comparator is connected to position the tool in the coordinate axis to position the tool accordingly. Generally, during the initial set up, the zero reference for the circuits will be connected to the comparator to drive the unit to a zero reference position.

In accordance with the present invention, a shift register is provided to automatically and sequentially establish interconnection of the X and Y control comparators into the circuit to cause relative movement of the tool in a rectangular path either in a clockwise or counterclockwise direction and automatically terminating the cycle when the tool returns to the zero reference position.

Generally, the shift register includes a single pair of electrically operated multiple contacts or switch means such as relay means adapted to be sequentially energized to sequentially insert the comparators for the coordinate control drive. Each of the relay means has two operative positions which are interrelated and interconnected to establish the four coordinate movements required for rectangular movement. The drive of the relay means is interconnected to a power source through the relay contacts of the opposite relay means and the opposite comparator to provide the required and desired operation of the relay means.

In a preferred construction of the present invention, each comparator employs a null amplifier having drive control contacts and sequencing contacts and the shift register is a pair of magnetically latched reed relays each having a set of contacts positionable in a set or reset position. A set coil and a reset coil are provided as a part of the relay. Pulsed energization of a coil moves the switch to the related position where it is held independently of the energization of the corresponding coil. Such position is held until the alternate coil is energized to reverse the position.

The set and reset coils are connected to pulse sources through the contacts of the opposite relay and the contacts of the opposite null amplifier in such a manner that only the relay associated with the established movement of the tool is actuated when it reaches its null position. This provides transfer from one section to the next section and back to the first section.

A start relay is interconnected into the circuit to initially disconnect the pulse system from the reset or the shift register to permit charging of the respective pulse sources for the respective relays. When a cycle is started, the control switch is closed to provide a transfer or shift pulse to both of the relays. One of the relays, however, will always be in the position established by the pulsed coil and consequently will remain in that position while the other one will be pulsed to change its position and establish the selected coordinate drive position.

The cycle is terminated at the zero reference point by employing an inhibit type circuit interconnected to permit the initial sequential insertion of the amplifiers into the circuit but to inhibit or terminate the pulsing for the first and third coordinate movement section after the third movement has been established and consequently inhibit further movement in the direction of the first and third controls. Consequently, the cycle will terminate when it reaches the initial starting point or the zero reference.

A directional selection switch is preferably provided interconnecting the contacts of the relays in such a manner that in the one position, the relative movement is first along the Y axis whereas in the second position, the movement reverses and is first along the X axis from the zero reference.

The drawing furnished herewith illustrates a preferred construction of the present invention in which the above advantages and features are clearly disclosed as well as others which will be clear from the following description.

Figure 2:
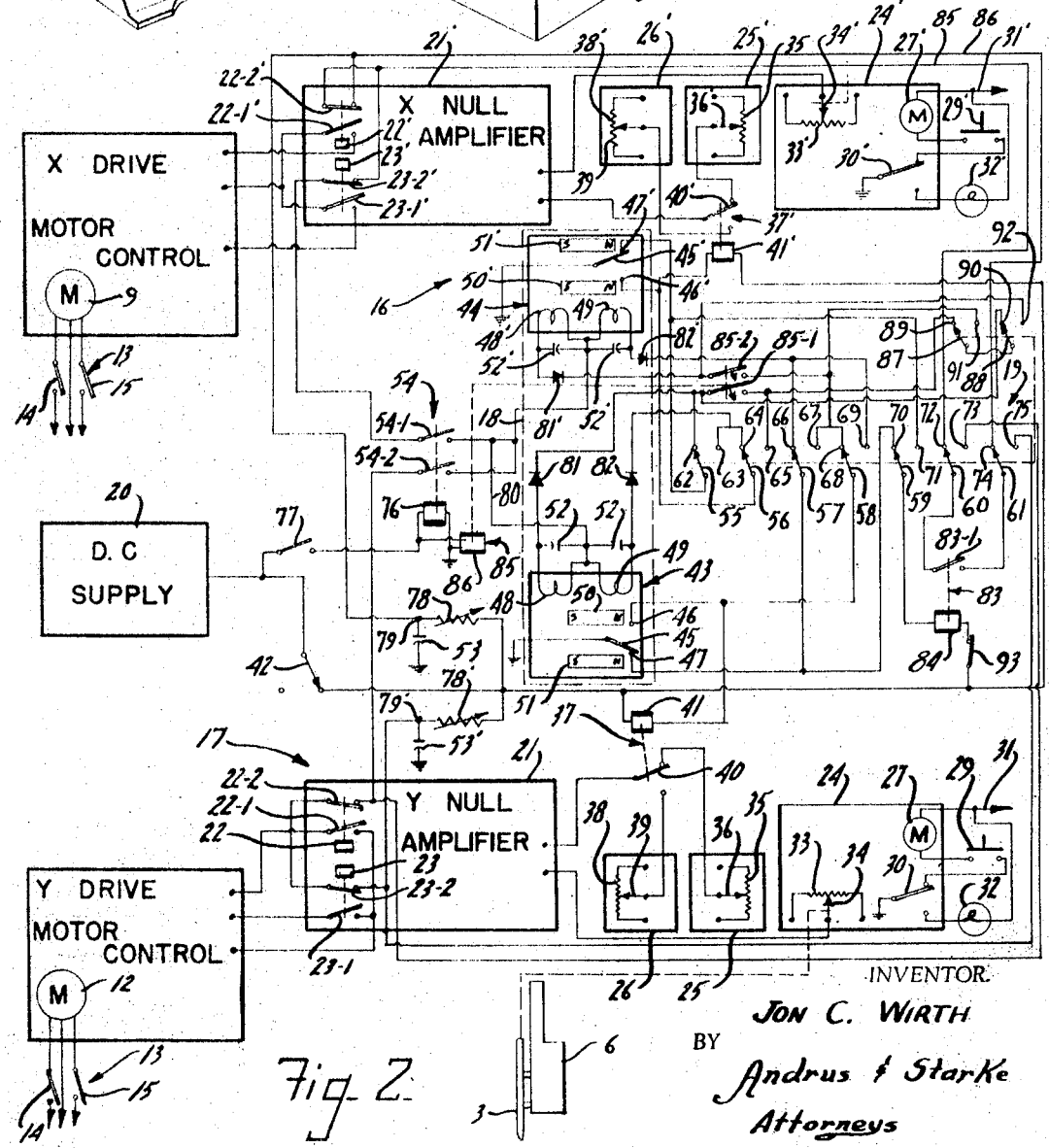

In the drawing:

FIG. 1 is a diagrammatic view of a flame cutting apparatus adapted to be driven in accordance with the present invention; and FIG. 2 is a schematic circuit diagram of a preferred circuitry showing the control for the apparatus shown in FIG. 1.

Referring to the drawings and particularly to FIG. 1, a flat metal plate 1 is shown mounted within a flame cutting apparatus 2 and particularly beneath a cutting torch 3. A rectangular cut 4, as shown in phantom, is to be made in plate 1.

The apparatus 1 may be similar to that more fully disclosed and described in applicant's copending application and is only briefly described herein in such detail as to provide illustration of one use of the present invention. Generally, a supporting bed 5 is provided upon which the plate 1 is supported. The flame torch 3 is supported by a torch holder 6 on a horizontally mounted torch beam 7. The torch holder 6 is adapted to move on the torch beam 7 to provide for rectilinear movement across the plate and thus provides for cutting one edge of the rectangular opening 4. The torch beam 7 is movably mounted upon a beam track 8 which supports the beam 7 for rectilinear movement along a line perpendicular to that of the torch beam and therefore perpendicular to the previously described movement of the torch 3 over the plate. This provides for cutting on perpendicular lines and therefore in accordance with a rectangular configuration. The present description will employ the X-Y designation, with the movement on the beam 7 identified as the X-direction or axis and that on the track 8 as the Y-direction or axis.

The torch 3 is driven on the track beam 7 through a drive motor 9 which is connected to drive a pinion 10. The pinion 10 is mounted in constant mesh with a rack 11 which is suitably connected to the torch 3 for rectilinear positioning of the torch along the beam 7.

A Y-axis motor 12 is similarly connected to position the torch beam 7 on the beam track 8. The motors 9 and 12 are suitable servo system motors such as more fully disclosed in the previously referred to copending application and shown for purposes of illustration herein similarly connected through motor control contactors 13 having forward an reverse contacts 14 and 15, respectively, for interconnecting of the corresponding motor to suitable power lines. The contactors 13 are in turn controlled by the control circuit of the present invention, such as shown in FIG. 2. The circuit automatically controls the positioning of the torch 3 with respect to the plate 1 to provide for the desired rectangular cutting of the plate.

The diagrammatical illustration and brief description of the cutting torch apparatus is believed sufficient to clearly describe the present invention and a particular application thereof.

Referring particularly to FIG. 2, the control circuit for the motors 11 and 12 generally includes an X-axis control section 16 and a Y-axis control section 17 having an output coupled to control the respective contactors 13 for the motors 11 and 12. The sections are interconnected for operation through a sequencing or shift register 18 and a directional control switch 19 to provide sequential clockwise or counterclockwise movement of the torch 3 in a rectangular path. The following description provides a clockwise movement as indicated by the arrows adjacent the phantom line in FIG. 1. A D.C. power supply 20 provides a suitable low voltage for operation of the shift register 18.

Generally, the control sections 16 and 17 in the illustrated embodiment of the invention are constructed in the same manner and with the same components and consequently the Y-axis section 17 will be described in detail with the corresponding elements of X-axis section 16 identified by similar primed numbers for simplicity and clarity of explanation.

Referring to the drawings and particularly to section 17, the control section includes a Y-null amplifier 21 including a Y-null drive response relay 22 and a negative Y-drive response relay 23. The relay 22 is responsive to drive in a positive direction while relay 23 is responsive to and controlled during movement in a relatively negative direction with respect to the reference position.

The relay 22 controls a set of normally open contacts 22–1 connected in circuit to control the Y-axis drive motor 12 and a set of normally closed contacts 22–2 interconnected to operate the shift register 18. The negative drive response relay 23 similarly controls similarly normally open contacts 23–1 and normally closed contacts 23–2 to provide a similar control, as more fully developed hereinafter in connection with the particular description of the shift register.

Generally, the input to the Y-null amplifier includes a Y-axis feedback unit 24, a Y-zero reference unit 25 and a delta-Y setting unit 26. Unit 24 is connected to provide a Y-sensitive position signal to the amplifier 21 and units 25 and 26 are selectively connected as the second input to the null amplifier 21 to provide a zero reference and a desired Y-setting from such zero reference into the null amplifier. Thus, the amplifier 21 will provide an error output for driving of the motor 12 whenever the input from unit 25 or 26 is set from and different than the position sensitive signal supplied by feedback unit 24. Further, the difference will be either positive or negative to establish control through either relay 22 or 23.

The Y-axis feedback unit 24 generally includes a manually operable machine reference setting motor 27 interconnected for energization through a manually operated zeroing switch 29 and a single-pole, double-throw limit switch 30 to power lines 31. Thus, when switch 29 is closed, the motor 27 is energized until the limit switch 30 moves to the alternate position. In the alternate position, the limit switch 30 breaks the circuit to the motor 27 and completes an energizing circuit to an indicating lamp 32 which indicates that the circuit has been zeroed.

The closing of switch 29 thus establishes the position as the basic reference from which all measurements are made. The zero-reference described herein refers to the initial starting point in the cutting configuration; i.e., one of the corners of the cut 4.

The feedback unit 24 further includes a feedback potentiometer 33 connected to D.C. power lines, not shown, and having a slider or tap 34 connected as a position sensitive to the null amplifier 21. In a practical construction, a coarse and fine sensing system may be used with the potentiometer 33 providing a coarse adjustment. A fine adjustment may be established by synchro units provided in the several units 24, 25 and 26.

The Y-zero reference unit 25 includes a potentiometer 35 interconnected to a power source and having a tap 36 selectively connected as an input to the amplifier 21. The tap 36 is connected through a set of normally closed contacts 37–1 of a delta-Y relay 37.

In the normal standby position, the Y-zero reference tap 36 is inserted into the circuit of the Y-null amplifier 21 and compared with the output of the tap 34 of the feedback poentiometer 35 to produce an error signal in the system. The error signal energizes either relay 22 or 23 and thereby closes the contacts 22–1 or 23–1 to provide for forward or reverse energization of the Y-axis motor 12 to drive the torch beam 7 along the track 8 to provide Y-axis movement to a zero reference.

When the torch 3 is set in a Y-zero reference position, the output of the amplifier 21 is nulled and opens the circuit to the Y-drive motor 12.

The delta setting unit 26 includes a manually positioned potentiometer 28 having a tap 39 interconnected through normally open contacts 37–2 of relay 37 as an input to the Y-null amplifier 21. The tap 39 is set in accordance with the desired movement of the torch along the Y-axis. The tap 39 is connected to the null amplifier 21 through the normally open contacts 37–2 and consequently is normally disconnected from the circuit until such time as the relay 37 is energized.

The relay 37 is shown with a common contact arm 40 common to the normally closed contacts 37–1 and the normally open contacts 37–2; with the common arm 40 connected as the input to the amplifier unit 21.

Generally, the operation of the Y-axis system can be briefly described as follows. The torch is manually placed in an initial reference position. The basic referencing switch 29 is then closed to energize motor 27 to drive the feedback potentiometer back to zero and thereby place it in a related zero reference position. When the feedback potentiometer is at zero, it provides automatic actuation of the limit switch 30 to open the circuit to motor 27 and illuminates the lamp 32. Potentiometer tap 34 is then in a corresponding basic reference position.

The Y-zero reference unit 25 is set to hold the torch in the initial or reference position. Thus, if the work tends to move from the set zero, the position of the tap 34 of the feedback unit 24 provides a signal to amplifier 21 which is either greater or less than that of the tap 36 of the reference unit 25. This provides an error input signal to the null amplifier 21 energizing the amplifier until such time as the torch 31 moves and repositions the coupled tap 34 to the null position. This positions and holds the torch 3 properly to the zero-reference on the Y-axis until the delta-Y unit is inserted.

The apparatus starts a cutting cycle at which time the Y-zero reference unit 25 is disconnected from the circuit and the corresponding delta-Y setting unit 26 is inserted into the circuit through the relay 37 to provide for controlled movement of the torch 3 along the Y-axis in accordance with the delta setting.

The relay 37 includes a relay winding 41 connected in circuit to one side of supply 20 through a selection switch 42 and through the shift register 18 to ground for selected transfer of the connection from unit 25 to unit 26 upon triggering of the shift register 18. Switch 42 is provided for use of the supply 20 in connection with an alternate control such as shown in the previously identified copending application.

The shift register 18 in the illustrated embodiment of the invention generally includes a Y-shift relay 43 and a similar X-shift relay 44. Each of the relays 43 and 44 is similarly constructed and interconnected in the circuit and to the corresponding sections 16 and 17 and consequently relay 43 is described in detail with the corresponding elements of relay 44 identified by similar primed numbers.

Generally, the illustrated shift relay 43 is a single-pole, double-throw switching structure including a single contact arm 45 connected respectively between a set contact 46 and a reset contact 47. The arm 45 is selectively moved to the contacts 46 and 47 by a set winding 48 and a reset winding 49.

Relay 43 is preferably a known magnetically responsive reed type switch in which holding magnets 50 and 51 or the like are provided to hold the contact arm 45 in engagement with contact 46 or 47. The contact arm 45 is moved from that position by pulsed energization of the opposite winding. For example, switch 43 shows the contact arm 45 in engagement with the reset contact 47. Consequently, energization of the reset winding 49 with not have any effect on the circuit as it is already in the reset position. However, pulsed energization of the set winding 48 provides a magnetic field drawing the contact arm 45 from contact 47 into engagement with the set contact 46. Once the contact arm 45 is moved to the set contact 46, it maintains that position until such time as the reset winding 49 is pulsed energized.

The reed type relays are relatively rapidly acting devices and consequently retarding capacitors 52 are connected one each in parallel with the set winding 48 and the reset winding 49. This insures that the incoming triggering pulse terminates before the switch has completed its movement and will only be actuated once for each incoming trigger signal.

The pulse circuit for the relay 43 includes a single pulsing capacitor 53 which is connected to energize the windings 48 and 49 through the contacts of the X-shift relay 44, the directional control switch 19, and the contacts 22–2′ and 23–2′ of the response relays 22′ and 23′ in the X-null amplifier 21′ and a start relay 54.

In the illustrated embodiment of the invention, the directional switch 19 is shown as a nine-pole, double-throw switch unit having seven contact arms 55 through 61, inclusive. Each of the contact arms is associated with a pair of contacts respectively numbered 62 through 75, respectively, in the drawings for purposes of subsequent description.

The paired contacts associated with arms 55 through 61, inclusive, provide for counterclockwise and clockwise rotational movement of the torch 3. The directional selection switch 19 is shown in position to provide for clockwise movement of the torch as hereinafter described.

The start relay 54 includes a control winding 76 connected to a power supply 20 in series with a cycling start control switch 77. Although shown as a manually operable switch 77, it will normally form contacts of a control relay, not shown, which may be connected in a cycle control circuit having interlocking contacts to hold the circuit in operation until the termination of the cycle and to provide interlocking with other functioning. The manual switch 77 is shown for simplicity and clarity of explanation.

The relay winding 76 is coupled to control normally open contacts 54–1 and 54–2 which are connected respectively in the pulsing circuit between the capacitors 53 and 53′ and the associated relays 43 and 44.

In particular, the pulse circuit for the relay 43 includes a variable resistor 78 connected between the positive side of the D.C. power supply 20 in series with capacitor 53 to ground. The junction 79 of the resistor 78 and the capacitor 53 is connected in series with the contacts 22–2′ and 23–2′ to the normally open contacts 54–1. The opposite side of the contacts 54–1 are connected to a common lead 80 to one side of the set winding 48 and the reset winding 49 of relay 43.

The circuit is completed through either the set winding 48 or the reset winding 49 as follows.

The set winding 48 has its opposite side connected in series with a diode 81 to the contact 62 of switch 19. Contact arm 55 is connected to the reset contact 47′ to ground in the normal standby position shown in full.

The reset coil or winding 49 is similarly connected in circuit through a diode 82 to the contact 64 of switch 19, the contact arm 56 which is connected to the set contacts 46′ of the shift relay 44 and the common contact arm 45′ to ground.

In the illustrated embodiment of the invention, the circuit to the reset coil 49 would be opened as a result of the opened contact 46′ in the relay 44. Thus, the first pulse in the circuit arising from discharge of the capacitor 53 upon the closing of contacts 54–1 energizes the set winding 48 and reverses the setting of the relay 43 which in turn will cause energization of the relay 37 to insert the delta-Y setting unit 26 into the circuit of the Y-null amplifier 21. Simultaneously, with the pulsing of the winding 48, the reset winding 49′ of relay 44 is pulsed. However, the relay 44 is already in the reset position and consequently it maintains its position.

The circuits for the relay 44 are traced as follows. The junction 79′ of the resistor 78′ and the capacitor 53′ is connected in series with the contacts 23–2 and 22–2 of the Y-null amplifier 21 and the contacts 54–2 of control relay 54 to the common connection between the windings 48′ and 49′ of relay 44. The circuit through the set winding relay 48' is traced through diode 81', contact 68 and contact arm 58 of directional switch 19 to contact 46 of shift relay 43. However, at the initial portion or triggering of the circuit, the Y-shift relay 43 is in the reset position and consequently the initial pulse cannot energize set winding 48'.

The circuit for reset winding 49' of X-shift relay 44 is traced through its initial portion to the common junction in the same manner as that just described for winding 48' and continues through the diode 82', contact 66 and contact arm 57 of directional switch 19 to the reset relay contact 47 and contact arm 45 of shift relay 43 to ground. Thus, the initial closing or energization of relay 54 will pulse winding 49' simultaneously with the pulsing of winding 48. However, relay 44 is in the reset condition and the pulsing thereof does not affect the X-shift relay 44 in any manner.

The windings 48' and 49' are connected to the pulsing capacitor 53. When the winding 48 is energized, as previously described, it reverses the circuit to relay 44 and inserts set winding 48' in a completed circuit. It is important therefore that the pulse terminate prior to the actual switching or the pulse from capacitor 53' can energize the set winding 48'. The capacitors 52 are connected in parallel with the respective windings of the shift relays 43 and 44 and the incoming pulse will terminate prior to completion of the switching action. Consequently, the circuit will establish and maintain the above described actuated positions with the contact arm 45 engaging the set contact 46 and the contact arm 45' remaining engaged with reset contact 47' as shown.

Relay 37 of the Y-drive section 17 is energized as a result of the connection of the relay winding 41 to ground through the set contact 46 and the contact arm 45 of relay 43. This automatically removes the Y-zero unit 25 and inserts the delta-Y setting unit 26 as the input to the null amplifier 21. The unbalance between the potential of tap 39 and the potential of tap 34 energizes the forward drive relay 22. The relay 22 therefore opens the contacts 22–2 and closes contacts 22–1. The closing of the contacts 22–1 completes the circuit to the Y-drive motor 12 causing the torch 3 to move along an assumed positive direction on the Y-axis. This movement continues until the amplifier 21 nulls out. Thus, during the movement along the Y-axis, the feedback system repositioned the potentiometer tap 34 in a direction to equal the signal of tap 39 of the delta-Y setting unit potentiometer 38.

During the drive to null in the Y-direction, the open contacts 22–2 break the circuit from the junction 79' of the resistor 78' and the capacitor 53' and consequently capacitor 53' is allowed to charge to the value of the D.C. voltage supply 20.

The X-null amplifier is in the null position and consequently contacts 22–2' and 23–2' are in the normally closed position. This maintains a circuit from the junction 79 through the null amplifier 21', the now closed contacts 54–1, the set relay coil 48, diode 81, contacts 62 and contact arm 54 of directional switch 19, reset contact 47' and contact arm 45' of the X-axis shift relay 44 to ground. This creates a bypass circuit from the capacitor 53 and consequently prevents charging of the capacitor 53.

Therefore, during the Y-directional movement, capacitor 53' charges while capacitor 53 does not. When the circuit reaches a null position, the output of amplifier 21 reduces to the zero setting and the contacts 22–1 and 22–2 revert to the normal standby position shown. Contacts 22–1 break the circuit for the Y-drive motor 12 and contacts 22–2 complete the pulsing circuit from the capacitor 53'. The pulsing circuit is traced as follows. Beginning with the capacitor junction 79', contacts 23–2 and 22–2, contacts 54–2 of relay 54, the set coil 48' of relay 44, diode 81', contact 68 and arm 58 of directional switch 19, the now closed contact 46 and contact arm 45 of relay 43 to ground. As a result, the relay 44 is now pulsed to the set position.

This completes a discharge circuit for the capacitor 53 through the X-null amplifier 21', contacts 54–1 of relay 54, the reset coil 49, diode 82, contact 64 and arm 56 of directional switch 19, and the now closed contacts 46' and 45' of relay 44 to ground 88. However, as previously noted, capacitor 53 was not charged and consequently, the circuit therethrough will not provide the necessary pulse to energize the reset relay winding 49 and the relay 43 will be maintained in the set condition shown.

With the circuit thus established, the relay 37 is maintained energized to hold the delta-Y setting unit in circuit with the Y-null amplifier 21 and thus hold the Y-directional motor 12 in an off state.

Simultaneously, however, the movement of the relay 44 to the set condition completes the circuit for the relay 37' and particularly connects the winding 41' between the power supply and ground through the set contact 46' and arm 45' of relay 44. As a result, the contacts of the relay 37' move to the alternate position and removes the X-zero reference unit 25' and inserts the delta-X setting unit 26' into the circuit of the X-null amplifier 21'.

As a result, the signal from the X-axis feedback potentiometer 33' and the signal from the delta-X setting potentiometer 38' provides an unbalanced directional signal to the X-null amplifier 21' and energizing relay 22' to actuate the forward drive contacts 22–1' and 22–2'. Contacts 22–1' complete the forward drive circuit for the X-drive motor 9 and contacts 22–2' open the pulsing circuit from the capacitor 53.

The X-control section 16 is then set in the same manner as the Y-section 17 was previously set and drives the torch along the positive X-direction; i.e. perpendicular to the previous movement and furthermore in accordance with the delta-X setting potentiometer 38' to establish the null position.

During this period of movement, the opening of the contacts 22–2' breaks the circuit from the junction 79 and allows capacitor 53 to charge. During this cycle, the capacitor 53' cannot charge because closed contacts 22–2 and 23–2 complete the path between the junction 79' and ground, as follows. Beginning at point 79', through the Y-null amplifier contacts and relay 54, the set coil 48' of relay 44, diode 81', contacts 68 and arm 58 of directional switch 19, the now closed or set relay 46 of relay 43 to ground.

The system now operates to control the X-drive motor 9 to move in accordance with the delta-X setting potentiometer 38'. When the torch 3 is moved in accordance with the setting, the potentiometer 33' provides a signal balancing that of the preset potentiometer 38' and the amplifier 21' in the null position and reverts to the standby position shown in full line in FIG. 2; that is, the contacts of relay 22' revert to the standby position shown. This opens the circuit for the X-drive motor 9. The closing of contacts 22–2' completes the discharge circuit for the capacitor 53 which then discharges through the X-null amplifier 21', contacts 54–1, the reset winding 49, contacts 64 and arm 56 of the directional switch 19, the set contacts 46' and arm 45' of the relay 44 to ground. Consequently, the relay 43 is reset to the full line position shown. The capacitor 53' was prevented from charging as a result of the completed circuit through the Y-null amplifier 21, relays 54 and 44, contacts 68 and arm 58 of directional switch 19, the set contacts 46 of the relay 43 to ground. Thus, the circuit to relay 37 and particularly winding 41 is broken as a result of the resetting of the Y-shift relay 43. The relay 37' however is maintained energized through the set condition of the shift relay 44. Consequently, at this point, the circuit is in condition holding the delta-X setting unit 26' in circuit to the X-null amplifier 21' and removing the delta-Y setting unit 26 and reinserting the Y-zero reference unit 25 in circuit with amplifier 21.

The input to the amplifier 21 is unbalanced in accordance with the difference between the setting of feedback potentiometer 33 and the Y-zero reference potentiometer 35. This will of course be equal to the delta-Y setting unit which had been previously inserted into the circuit to offset the feedback potentiometer 33 a corresponding amount. The offset or unbalance is in the opposite relative direction and provides a relative negative signal to amplifier 21.

The amplifier 21 therefore operates the negative relay 23 to reverse the position of its contacts 23–1 and 23–2. Contacts 23–1 energize the Y-drive motor 12 in a direction to return the system to the Y-zero reference. During this portion of the cycle, the circuit to the capacitor 53' is opened at the amplifier 21 and consequently capacitor 53' charges to its full charge. The capacitor 53 is prevented from charging as a result of the circuit through the X-null amplifier 21'.

When the system has driven the torch to the Y-zero reference position, the amplifier 21 is again nulled and the contacts 23–1 and 23–2 revert to the standby position opening the circuit to the Y-drive motor 12 and completing the circuit from the capacitor 53'. The capacitor 53' now discharges through the reset winding 49' of the relay 44, diode 82', contact 66 and arm 57 of switch 19 and reset contact 47 and arm 45 of relay 43 to ground. This resets relay 44 to the full line position shown breaking the circuit to the winding 37' to reset the contacts 37–1'. The delta-X setting unit 26' is removed from the circuit of the null amplifier 21' and the X-zero reference unit 25' is reinserted into such circuit whereby the negative relay 23' is actuated in accordance with the difference between the settings of the X-zero reference unit 25' and the X-drive feedback unit 24'. The X-drive motor 9 is now driven in a reverse direction to drive the torch 3 back to the X-zero setting. The contacts 23–2' also open to break the bypass circuit from the positive supply for the capacitor 53. Consequently, capacitor 53 can now charge. The null amplifier 21 having reset prevents charging of the capacitor 53'. As a result, the Y-drive motor will be held in its fixed position holding the torch in the Y-zero reference position and the X-drive motor will drive the tool along the X-axis towards the zero reference position and until such time as it reaches the zero reference position. At the latter time, the X-null amplifier 21' will be nulled, reset contacts 23 to stop the drive motor 9 and close the pulsing circuit from the capacitor 53. Generally, this would tend to again pulse the Y-shift relay 43 and cause recycling of the system.

In the illustrated embodiment of the invention, an inhibit relay 83 is connected to bypass the pulsing contacts in the null amplifiers 21 or 21', depending upon the direction of rotation, to prevent recycling. More particularly, the inhibit circuit includes winding 84 of relay 83 connected in circuit between the positive line and contact arm 59 of directional switch 19. Contact arm 59 engages contact 70 during clockwise movement and contact 71 during counterclockwise movement. Contact 70 is connected to the reset contact 47 of Y-shift relay 43 and the alternate contact 71 is connected to the corresponding reset contact 47' of X-shift relay 44.

In the illustrated embodiment of the invention, the arm 59 engages contact 70 and thus the relay winding 84 is energized as soon as the Y-shift relay 43 is in the reset position with arm 45 engaging contact 47.

This was established at the original start position and also when the Y-shift relay 44 was actuated to reinsert the Y-zero reference 25 into the circuit to drive the unit back over to the Y-zero reference position. The energization of winding 84 closed a set of contacts 83–1 connected respectively between the arms 60 and 61 of directional switch 19. In the illustrated full line position, the arms 60 and 61 engage contacts 72 and 74 which are respectively connected via leads 85 and 86 across the connections to contacts 22–2' and 23–2' of the X-null amplifier 21'. Consequently, after the relay 83 is energized, a direct bypass of the contacts 22–2' and 23–2' of null amplifier 21' is established. This establishes a completed circuit from the positive supply to bypass the capacitor 53 and thereby prevent the charging thereof and the pulsing of the relay 43.

In the alternate position, the arms 60 and 61 engage contacts 73 and 75, which are similarly connected to bypass the contacts 22–2 and 23–2 of the amplifier 21. This is necessary as the final movement in counterclockwise directional movement of torch 3 involves a final movement in the Y-direction rather than the X-direction as in clockwise movement provided by the illustrated full line position of the directional switch 19.

As previously noted, the capacitors 52 and 52' are provided to prevent sporadic pulsing of the relay means which is interconnected for alternate actuation through the switches or contacts of the opposite relay means. In the illustrated embodiment of the invention, a further means is provided to positively prevent operative energizations of both relays 43 and 43' during the initial cycle. An interlocking time delay relay 85 is provided having a first set of normally open contacts 85–1 connected in series with the set winding 48 of relay 43 and a second set of normally open contacts 85–2 connected in series with the set winding 48' of relay 43'. The winding 86 of the relay is connected in parallel with the winding 76 of relay 54 and is thus energized during the cycle of operation. The normally open contacts of relay 85 close a selected time after energization to complete the circuits previously described. The switch 19 includes a pair of additional contact arms 87 and 88 interconnected by a jumper lead. The contact arms selectively engage clockwise contacts 89 and 90 or counterclockwise contacts 91 and 92. The contacts 89 and 90 are connected in parallel with relay contacts 85–1 and contacts 91 and 92 are similarly connected in parallel with relay contacts 85–2. Thus, in the full line position shown, the circuit to the set winding 48 is completed during the first pulse by the switch 19 bypassing the time relay contacts 85–1. The circuit to set winding 48' however is held open by relay contacts 85–2. After the selected time, the timing relay contacts 85–1 and 85–2 close and remain closed for the balance of the cycle to permit the previously described cyclical and sequential movement.

In the alternate position of the switch 19, the contact arms 55 through 61, 87 and 88 engage the alternate odd numbered contacts 63 through 75, 91 and 92. The set and reset windings of relays 43 and 44 are then connected to the opposite contacts of the opposite shift relay. Thus, set winding 48 will now be connected to the set contact 46' of relay 44 and reset winding 49 will be connected in circuit through the reset contact 47' of relay 44. Similarly, windings 48' and 49' are now connected in circuit through the reset contact 47 and the set contact 46 of relay 43, respectively.

Therefore, the sequence established will be as follows. At the initial start, both capacitors 53 and 53' will be charged as the bypass circuits are opened at relay 54 and consequently both discharge through the respective windings of shift relays 43 and 44. For reasons similar to those set forth with respect to the previous description for the clockwise rotational setting, the set winding 48' of relay 44 is energized and contact arm 45' engages set contact 46'. This energizes relay 37' and inserts the delta-X setting unit 26' in the X-control section 16 to drive the X-motor 9 in a positive direction from the X-zero reference. The Y-drive section 17 remains in the illustrated full line position with the Y-zero reference unit 25 in the circuit to hold the torch 3 in the Y-zero reference position. When the torch 3 has been driven to the position of the delta-X setting, the relay 43 is pulsed to insert the delta-Y setting unit 26 in its circuit and the delta-X setting unit 26' is held in circuit. The torch 3 is now driven in a positive Y-direction in accordance with the delta-Y setting. When the torch 3 has been driven to the delta-Y setting, the relay 44 is pulsed to reset the relay 44 and thereby remove the delta-X setting unit 26' and reinsert the X-zero reference unit 25' in the related section 16. The torch is then driven in a negative direction to the X-zero reference setting.

During the latter movement, the inhibit relay 83 is also energized through the contacts 47' and arm 45' of relay 44 to close the contacts 83–1 and provide a bypass circuit across the pulse relay contacts 22–2 and 23–2 of the amplifier 21 to prevent any further pulsing of the relay 44. This holds relay 44 in the reset position and prevents possible recycling when the torch reaches the initial starting point.

The X-drive motor 9 is energized in a reverse direction and returns the torch 3 to the X-zero reference position. At this time, the relay 43 is pulsed, resets the relay 43 and reinserts the Y-zero reference unit 25 into the section 17. The Y-drive motor 12 is energized in a reverse direction and returns the torch 3 to the Y-zero reference setting to complete the counterclockwise movement. Further, movement is being prevented by the energized inhibit relay 83.

In certain operations, the operator may prefer to start the work at a corner different than that of the X and Y zero reference. The above action of the inhibit relay would prevent a complete cut from such other starting point. The control system shown includes a normally closed switch 93 in the circuit of relay winding 84. By opening switch 93 and thus disabling inhibit relay 83, the operator may select the initial work action at some point removed from the X and Y zero reference and complete the cut.

The present invention thus provides a means for forming rectangular-shaped openings without undue complexity in the transfer circuitry. Thus, the shift register employs a pair of readily available, simple and inexpensive electromagnetic means or other similar operational means interconnected to provide the necessary sequencing operations.

Various modes of carrying out the invention are contemplated as being within the scope of the following claims particularly pointing out and distinctly claiming the subject matter which is regarded as the invention.

I claim:

1. In a control system for sequentially moving a member in a pair of rectilinear directions defining a closed path of opposite parallel sides,
    a first servo system for reversibly driving the member in a first of said directions and having a presettable put means to establish the amount of movement in said second direction from a reference position, and
    a second servo system for driving the member in a second of said directions and having a presettable input means to estalish the amount of movement in said second direction from a reference position, and
    a shift register having a pair of operating means interconnected to alternately actuate each other and each controlling one of said servo systems to establish a sequence wherein both of said servo systems are operative and including a first movement with the first system in a drive mode to move the member in the first direction and with the second system in a reference mode to hold the member in the first referenced position of the second direction, a second movement with the first system in a reference mode to hold the member in the position of the previous movement and the second system in a drive mode to move the member in the second direction, a third movement with the first system in a reverse drive mode to oppositely move the member along the first of said directions and the second system in a reference mode to hold the member in the position of the previous movement and a fourth movement with the first system held in a reference mode to hold the member in the position of previous movement and the second system in a reverse drive mode to oppositely move the member along the second of said directions.

2. In a control system for driving a member in a generally rectangular path, comprising
    a first directional reversible drive means,
    a second directional reversible drive means,
    a first drive control section including a first comparator having a pair of input means and a first feedback position signal unit connected to the one input means and a first reference signal unit and a first delta signal unit, said comparator having an output means connected to actuate the first directional drive means in accordance with the comparative signal at the two input means,
    a second drive control section including a second comparator having a pair of input means and having a second feedback position signal unit connected to one of the input means and having a second reference signal unit and second delta signal unit, said second comparator having an output means connected to actuate the second directional drive means in accordance with the comparative signal at the two input means, and
    a shift register having an operating means to sequentially establish the connection states to the second input means of the comparators of (1) the first delta signal unit and the second reference signal unit, (2) the first and second delta signal units, (3) the second delta signal unit and the first reference signal unit, and (4) the first and second reference signal units, said operating means including a pair of switching means interconnected to the comparators and to each other to establish alternate actuation of the switching means, each actuation establishing one of said connection states.

3. The control system of claim 2 including a directional switch means forming a part of said shift register and having a first position establishing the defined sequential movement and a second position establishing a reverse sequential movement.

4. In a control system for sequentially moving a member in a plurality of directions in accordance with one of a predetermined number of geometric configurations each of which is comprised of a plurality of lineal boundaries,
    a plurality of servo systems, one for reversibly driving the member in each of said directions and each system having a presettable input means to establish the amount of movement in a corresponding direction from a reference position, and
    a shift register having a plurality of operating means, one for each system and said operating means being interconnected to actuate each other in a predetermined sequence to selectively operatively connect said servo systems and each controlling a corresponding servo system to establish sequential movement in said directions corresponding to the lineal boundary of the selected geometric configuration, each of said operating means being a relay means having a set position switch means and a reset position switch means and including an actuating means to alternately actuate said switch means and a releasable holding means to hold the relay means in the position last established by the actuating means, the actuating means of the first relay means connected in an operating circuit including the contacts of the second relay means and the output means of the second servo system and the actuating means of the second relay means connected in an operating circuit including the contacts of the first relay means and the output means of the first servo system.

5. The control system of claim 4 wherein said switch means includes magnetically operated switch contacts and said holding means includes holding magnets, one magnet for each of said switch contacts.

6. The control system of claim 4 wherein said operating means includes a set winding and a reset winding, and a reversing sequence switch being connected between said windings and the switch means, said sequence switch having a first position connecting the set windings in circuit with the reset switch means of the opposite relay means and the reset windings in circuit with the set switch means of the opposite relay means and having a second position connecting the set windings in circuit with the set switch means of the opposite relay means and the reset windings in circuit with the reset switch means of the opposite relay means.

7. In the control system of claim 1, having the path defined by X- and Y-coordinates, having
an X-directional reversible drive means,
a Y-directional reversible drive means,
the first servo system including an X-drive control section including an X-null amplifier having a pair of X-input means, said section including an X-feedback position signal unit connected to the one input means and an X-zero reference signal unit and a delta-X signal unit, X-shift means selectively connecting the reference signal unit and the delta X-signal unit to the second input means of the X-null amplifier, said X-null amplifier having an output means connected to actuate the X-directional drive means in accordance with the comparative signal at the two input means,
the second servo system including a Y-drive control section including a Y-null amplifier having a pair of Y-input means, said Y-direction having a Y-feedback position signal unit connected to one of the Y-input means and having a Y-zero reference signal unit and a delta-Y signal unit, Y-shift means selectively connecting the Y-zero reference signal unit and the delta Y-signal unit to the second input means of the Y-null amplifier, said Y-null amplifier having an output means connected to actuate the Y-directional drive means in accordance with the comparative signal at the two input means,
X-transfer means to sequentially insert the X-zero reference signal unit and the delta-X signal unit,
Y-transfer means to sequentially insert the Y-zero reference signal unit and delta-Y signal unit,
said shift register including first switching means to actuate the X-transfer means and second switching means to actuate the Y-transfer means, said switching means each having pulsed operating means,
first pulsing circuit means for the operating means of the first switching means and including a rechargeable first pulse means, the second switching means and the output means of the Y-null amplifier,
second pulsing circuit means for the operating means of the second switching means and including a rechargeable second pulse means, the first switching means and the output means of the X-null amplifier, and
said pulse means being rechargeable only when the corresponding pulsing circuit means is open.

8. The control system of claim 7 wherein said pulse means are capacitors connected to a power source means in parallel with the corresponding switching means and the output means.

9. The control system of claim 7 having a main control switch means connected in said energizing circuits and operable to open said pulsing circuit means to initially charge said pulse means.

10. The control system of claim 7 having start means connected in the pulsing circuit means to initially open said circuits to charge both said pulse means and an interlocked timing means selectively connected to hold open one of said pulsing circuit means for a selected time after the operation of the start means.

11. The control system of claim 10 wherein said start means is a relay having contacts connected in each of said pulsing circuit means and said timing means includes a timing relay having timing contacts in each of said pulsing circuit means and a disconnect switch means connected to bypass said timing contacts.

12. The control system of claim 7 wherein said switching means include a Y-shift relay and an X-shift relay, each relay having set contacts and reset contacts respectively closed by a set winding and a reset winding and held in the closed position by a releasable latch means.

13. The control system of claim 12, wherein,
said X-null amplifier output means includes Y-pulse contacts and said Y-null amplifier output means includes X-pulse contacts,
said first pulsing circuit means includes a charging circuit including said first pulse means and a first discharging circuit connected in parallel with the pulse means, said discharging circuit serially including the contacts of the Y-pulse contacts, the set winding of the X-shift relay, and the reset contacts of the Y-shift relay and a second discharging circuit connected in parallel with the said first pulse means, said second discharging circuit serially including the contacts of the Y-null amplifier relay, the reset winding of the X-shift relay, and the set contacts of the Y-shift relay, and
said second pulsing circuit means includes a second charging circuit including said second pulse means and a third discharging circuit connected in parallel with the second pulse means, said third discharging circuit serially including the X-pulse contacts of the X-null amplifier, the set winding of the Y-shift relay, and the reset contacts of the X-shift relay and a fourth discharging circuit connected in parallel with said second pulse means, said fourth discharging circuit serially including the Y-pulse contacts of the X-null amplifier, the reset winding of the Y-shift relay, and the set contacts of the X-shift relay.

14. The control system of claim 13 including a start relay means having a pair of normally open contacts connected one each in series parallel with the discharging circuits of the first and second pulsing circuit means, a timing relay means having a pair of normally open timing contacts connected one each in the discharging circuits for said set windings, a pair of normally open switches connected one each in parallel with said timing contacts, and means to simultaneously energize the start relay means and the timing relay means.

15. The control system of claim 13 including an inhibit relay means having an inhibit operating means connected in circuit to one of said reset contacts and having contacts connected in parallel with the pulse contacts of the opposite null amplifier.

16. The control system of claim 15 having a switch means connected in the circuit of the inhibit operating means to selectively remove the inhibit relay means.

17. The control system of claim 13 having a reverse sequence switch means interconnecting said set and reset winding in said discharging circuits and having a first position establishing said discharging circuits and a second position reversing the connection of the winding to the contacts of the shft relay.

18. The control system of claim 17 including an inhibit relay having an inhibit operating means and a set of inhibit contacts, and
said sequence switch means interconnecting the inhibit operating means in circuit with the reset contacts of the Y-shift relay in the first position and with the reset contacts of the X-shift relay in the second position and interconnecting the inhibit contacts in parallel with the pulse contacts of the X-null amplifier in the first position and in parallel with the pulse contacts of the Y-null amplifier in the second position.

19. In a control system for sequentially moving a member in a plurality of directions in accordance with one of a predetermined number of geometric configurations each of which is comprised of a plurality of lineal boundaries, a plurality of servo systems, one for reversibly driving the member in each of said directions and each system having a presettable input means to establish the amount of movement in a corresponding direction from the reference position, and a shift register having a plurality of operating means, one for each system and said operating means being interconnected to actuate each other in a predetermined sequence to selectively operatively connect said servo systems and each controlling a corresponding servo system to establish sequential movement in said directions corresponding to the lineal boundary of the selected geometric configuration, said shift register and servo systems include means to maintain at least two of said servo systems operative with one servo system actuated and operatively connected to drive the member in a given direction and another servo system operatively connected to hold the member in a reference position along said given direction and lineal boundary.

20. In a control system for sequentially moving a member in a plurality of directions in accordane with one of a predetermined number of geometric configurations each of which is comprised of a plurality of lineal boundaries, a plurality of servo systems, one for reversibly driving the member in each of said directions and each system having a presettable input means to establish the amount of movement in a corresponding direction from a reference position, and a shift register having a plurality of operating means, one for each system and said operating means being interconnected to actuate each other in a predetermined sequence to selectively operatively connect said servo systems and each controlling a corresponding servo system to establish sequential movement in said directions corresponding to the lineal boundary of the selected geometric configuration, each of said operating means includes a switching means controlling the movement of the member in the corresponding direction and a second switching means connected to actuate the operating means of the next succeeding servo system in response to the movement in the corresponding direction in accordance with the length of the lineal boundary.

21. In a control system for sequentially moving a member in a plurality of directions, a plurality of servo systems, one for reversibly driving the member in each of said directions and each system having a presettable input means to establish the amount of movement in a corresponding direction from a reference position, each servo system including a comparator connected to compare a signal from the presettable input means and a signal from a member position sensing means, and a shift register having a plurality of operating means, one shift register for each system, each of said operating means including a relay means having a set position switch means and a reset position switch means and an actuating means to alternately actuate set switch means and a releasable holding means to hold the relay means in the position last established by the actuating means, the actuating means of the first relay means connected in an operating circuit including the contacts of the second relay means and the output means of the second comparator and the actuating means of the second relay means connected in an operating circuit including the contacts of the first relay means and the output means of the first comparator.

References Cited

UNITED STATES PATENTS

| | | | |
|---|---|---|---|
| 2,941,136 | 6/1960 | Marantette et al. | 318—23 XR |
| 3,003,094 | 10/1961 | Gough | 318—28 XR |
| 3,099,777 | 7/1963 | Davis | 318—28 |
| 3,340,447 | 9/1967 | MacDonald | 318—18 |

BENJAMIN DOBECK, Primary Examiner

U.S. Cl. X.R.

318—28

PO-1050
(5/69)

UNITED STATES PATENT OFFICE
CERTIFICATE OF CORRECTION

Patent No. 3,465,219      Dated Sept. 2, 1969

Inventor(s) J. C. Wirth

It is certified that error appears in the above-identified patent and that said Letters Patent are hereby corrected as shown below:

Column 11, line 51, cancel "second" and substitute --first--

Column 14, line 61, cancel "shft" and substitute --shift--

SIGNED AND
SEALED
APR 28 1970

(SEAL)
Attest:

Edward M. Fletcher, Jr.
Attesting Officer

WILLIAM E. SCHUYLER, JR.
Commissioner of Patents